Patented Feb. 21, 1939

2,147,635

UNITED STATES PATENT OFFICE 2,147,635

DYESTUFF PASTES AND PROCESS FOR APPLYING THE SAME

John Elton Cole, Wilmington, Del., assignor to E. I. du Pont de Nemours & Company, Wilmington, Del., a corporation of Delaware No Drawing. Application February 8, 1938, Serial No. 189,333

4 Claims. (Cl. 8—70)

This invention relates to a new and improved process for the printing of vat dyestuffs of the dibenzanthrone series and more particularly to the preparation of color pastes of stable leuco derivatives of the alkylation products of dihydroxydibenzanthrones of the type more particularly described in U. S. Patent 1,531,261 and to a process for applying them to the fiber.

Vat dyestuffs are generally marketed in the stable keto form because they are unstable in the ordinary reduced state to which they must be converted in their application to the fibers. In the dyeing of vat dyestuffs the color in the keto form is usually reduced in an alkaline solution with an alkali-metal hydrosulfite, and the fiber is impregnated with this solution of the color in soluble form. The dyed fiber is then treated with air or other oxidizing agent to convert the color to the insoluble keto form on the fiber. In the printing of vat dyestuffs somewhat more stable reducing agents, such as glucose, stannous oxides, ferrous oxides, and more recently the formaldehyde stabilized hydrosulfite, have been employed, which permit the application of the color to the fiber in the insoluble form where it is reduced so that it can be absorbed by the fiber in the printed designs as the soluble leuco, by the use of elevated temperatures, such as by steaming. The color is then oxidized to fix it in the insoluble keto form in the fiber. The methods usually required for the printing of vat dyestuffs are not suitable for the printing of many other dyestuffs, such as the stabilized azoic colors of the ice color type, which are deleteriously affected by the use of the reducing agents generally employed with vat dyestuffs.

It has heretofore been disclosed that certain stabilized leuco derivatives of substituted indigo and thioindigo compounds, when mixed with ferrous salts and assistants such as glycerine or glycol, could be printed in the usual way with the use of much less reducing agent than was required to print the compound when employed in the ordinary keto form. However, it has been found that vat dyestuffs of the anthraquinone series in general do not form stable leuco derivatives which are reconvertible to the ordinary soluble leuco form under conditions suitable for their application to fibers in combination with stabilized azo dyestuffs.

In the copending application Serial No. 186,750, there has been described the preparation of alkali insoluble stable leuco compounds of the alkyl ethers of Bz-2,Bz-2'-dihydroxydibenzanthrone which can be reconverted to the ordinary water soluble leuco form without the use of reducing agents.

It is an object of this invention to provide stable dyestuff pastes of the alkyl ethers of dihydroxydibenzanthrone of U. S. application Serial No. 186,750, which can be printed without the use of additional reducing agents in the shades usually obtained from the parent dyestuff when applied by the usual printing methods.

It is a further object of the invention to prepare a dyestuff paste of the stable reduced alkyl ethers of dihydroxydibenzanthrone which contain the necessary reagents useful in reconverting the stable leuco compound to the ordinary leuco form during the printing process, without the use of additional reducing agents in the printing gum formula.

It is a still further object of this invention to provide an improved method for printing these new stabilized leuco derivatives of the alkyl ethers of dihydroxydibenzanthrone on fibers without the use of the so-called volatile reducing agents, which evolve noxious gases when acidified, and in combination with stabilized azoic dyestuffs of the ice color type.

I have found that the stable leuco derivatives of the alkyl ethers of Bz-2,Bz-2'-dihydroxydibenzanthrone which are especially stable toward air oxidation and are insoluble in cold dilute aqueous alkalies can be mixed with a solvent or assistant of the following general formula

wherein $R_1$ stands for hydrogen, or an alkyl or alkylol group, $R_2$ stands for an alkyl or alkylol group, and $R_3$ stands for an alkylol group, and with a reducing salt such as ferrous or stannous oxide to give a stable color paste which can be employed in the printing of fibers in the usual printing gum formula containing alkalies and thickeners, without the usual reducing agents normally contained therein. Such printing pastes may be applied to cloth alone or in combination with stabilized azoic colors. The combination prints may be developed by first developing the stabilized anthraquinone vat dyestuffs by the usual aging process with neutral steam and then subjecting the fiber to an acid aging to develop the azoic dyestuff, after which the cloth is treated with oxidizing agents and subsequently soaped and dried in the usual manner.

The following examples are given to illustrate the invention more fully. The parts used are by weight.

Example 1

5.1 parts of the stable leuco derivative of Bz-2,Bz-2'-dimethoxydibenzanthrone, which is described more fully in copending application Serial No. 186,750 to Stallmann and Wentz, are mixed with 50 parts of triethanolamine (technical). To this suspension are added 20 parts (100% basis) of a freshly precipitated aqueous suspension of hydrated ferrous oxide and additional water, if necessary, to give a total weight of 100 parts.

Example 2

A printing paste of the stable leuco color paste of Example 1 may be made as follows:

20 parts of the stable leuco color paste are mixed with 80 parts of a printing gum made up according to the following formula:

| | Parts |
|---|---|
| Starch, British gum thickener | 650 |
| Potash (dissolved at 170° F.) | 120 |
| Water | 180 |
| Glycerine | 50 |
| Total | 1000 |

The starch British gum thickener used in this formula is made up by boiling together for 15 minutes—

| | Parts |
|---|---|
| Wheat starch | 100 |
| British gum | 300 |
| Water | 600 |
| Total | 1000 |

This printing paste is printed on cotton in the usual manner. The printed goods are passed through a rapid ager (using neutral steam) and developed after aging by oxidation in a dilute chrome acetic acid bath. The goods are then soaped, rinsed, and dried. The print obtained by this process is essentially similar in shade to a corresponding print of the dimethoxydibenzanthrone itself when printed by the usual formulas which involve the use of large amounts of sodium formaldehyde sulfoxite. The use of these stable leuco derivatives therefore eliminates the formation of noxious fumes in the aging process.

Example 3

The printing paste as obtained in Example 2 may be printed in the same pattern with stabilized azoic colors, for instance with an azoic printing paste made up as follows:

Azoic color printing paste 4 parts of the azoic color preparation, composed of—

50 parts of a water soluble stable diazoimino compound from p-chloro-o-anisidine and
50 parts o-phenetidide of b-oxynaphthoic acid,

| | Parts |
|---|---|
| NaOH 30% | 1.43 |
| H₂O | 24.57 |
| Starch tragacanth thickener | 70 |

The starch tragacanth thickener employed in this paste is made up in the usual manner, employing—

| | Parts |
|---|---|
| Wheat starch | 80 |
| Gum tragacanth 6% | 360 |
| H₂O | 510 |
| Glycerine | 50 |
| Total | 1000 |

The goods printed with the azoic and vat dyestuff pastes thus obtained are run through the rapid ager and then immediately through an acid ager in the presence of acetic acid fumes. After the acid aging the print is developed by the usual oxidation with chrome acetic acid followed by soaping and rinsing as mentioned in Example 2. In this manner a two-color pattern is obtained, the one shade being an attractive green and the other shade an attractive scarlet. By running the obvious control tests it can be demonstrated that when applied in this manner the scarlet is not adversely affected by the acid aging. Furthermore, due to the absence of undesirable decomposition products from formaldehyde-hydrosulfite reducing agents, there is no halo where the green part of the pattern is closely adjacent to the scarlet part. This last difficulty is always encountered when the printing colors containing azo groups are printed adjacent to vat colors containing an excess of sodium formaldehyde sulfoxylate.

Example 4

In a manner exactly analogous to Example 1, a color leuco paste is prepared containing stannous oxide instead of the ferrous oxide. By printing this color composition according to the methods described in Examples 2 and 3 essentially similar results are attained.

By substituting diethanolamine, monoethanolamine, or methyl glucamine for the triethanolamine in Example 1, satisfactory results can be obtained when the paste is printed according to Example 2 or 3.

This invention as above described is particularly applicable to the printing of any of the stabilized leuco derivatives of the alkylation products of Bz-2,Bz-2'-dihydroxydibenzanthrone of the type more specifically described in copending application Serial No. 186,750, such as the straight alkyl ether of Bz-2,Bz-2'-dihydroxydibenzanthrone, or those alkylation products resulting from the use of dihalogen alkyl and unsaturated alkyl compounds which may or may not form cyclic ether compounds. As illustrative of this type are the condensation products of ethylene dibromide, 1,3-dichlorobutene, 1,3-dibromopropane, with Bz-2,Bz-2'-dihydroxydibenzanthrone, etc. Any of the highly basic tertiary nitrogen bases of the type formulated above, and also compounds such as pyridine, pyridinium compounds, ethylene diamine and quaternary ammonium salts, are suitable for reconverting the stable leuco to the common soluble leuco form. The compounds which are preferably employed in the preparation of the color pastes according to this invention are the alkanolamine bases specifically formulated in the introduction of this case, although other bases may be used where the particular printing conditions permit. The dye preparations may be made up containing from 40 to 50% of the alkanolamine and from 10 to 20% of the metallic hydroxides, although larger quantities of either or both may be employed.

I claim:

1. A color paste comprising the stable leuco derivative of an alkyl ether of Bz-2,Bz-2'-dihydroxydibenzanthrone, a basic organic nitrogen compound of the formula

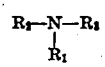

wherein R stands for a substituent of the class consisting of hydrogen, alkyl, and alkylol groups, R₂ stands for a substituent of the class consisting of alkyl and alkylol groups, and R₃ stands for an alkylol group, and a reducing salt of the class consisting of ferrous and stannous salts; said leuco derivative being stable to air oxidation in the dry state and in cold dilute caustic alkali solution and being reconvertible to the common leuco form when heated at approximately 100° C. in the presence of alkalies.

2. A printing paste comprising the stable leuco derivative of an alkyl ether of Bz-2,Bz-2'-dihydroxydibenzanthrone, an alkali, a basic organic compound of the formula

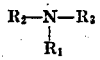

wherein R stands for a substituent of the class consisting of hydrogen, alkyl, and alkylol groups, R₂ stands for a substituent of the class consisting of alkyl and alkylol groups, and R₃ stands for an alkylol group, a reducing salt of the class consisting of ferrous and stannous salts, and the conventional printing gum thickeners, said leuco derivative being stable to air oxidation in the dry state and in cold dilute caustic alkali solution and being reconvertible to the common leuco form when heated at approximately 100° C. in the presence of alkalies.

3. The process which comprises applying to the fiber a printing paste comprising the stable leuco derivative of an alkyl ether of Bz-2,Bz-2'-dihydroxydibenzanthrone which is stable to air oxidation in the dry state and in cold dilute caustic alkali solution and which is reconvertible to the common leuco form when heated at approximately 100° C. in the presence of alkalies, in combination with a basic organic nitrogen compound of the formula

wherein R stands for a substituent of the class consisting of hydrogen, alkyl, and alkylol groups, R₂ stands for a substituent of the class consisting of alkyl and alkylol groups, R₃ stands for an alkylol group, and a reducing salt of the class consisting of ferrous and stannous salts, and developing the resulting print by a steaming process.

4. The process for preparing multicolor prints which comprises applying to the fiber in combination with a stabilized azoic color which is normally printed in alkaline pastes and developed by an acid aging, a stabilized leuco derivative of an alkyl ether of Bz-2,Bz-2'-dihydroxydibenzanthrone which is stable to air oxidation in the dry state and in cold dilute caustic alkali solution, and which is reconvertible to the common leuco form when heated to approximately 100° C. in the presence of an alkali, said stabilized leuco derivative being applied to the fiber in the presence of a basic organic nitrogen compound of the formula

wherein R stands for a substituent of the class consisting of hydrogen, alkyl, and alkylol groups, R₂ stands for a substituent of the class consisting of alkyl and alkylol groups, and R₃ stands for an alkylol group, and a reducing salt of the class consisting of ferrous and stannous salts, subjecting the combination print to a neutral steaming to develop the vat dyestuff and then to an acid aging to develop the azoic color.

JOHN ELTON COLE.